United States Patent
Smee et al.

(10) Patent No.: US 10,841,070 B2
(45) Date of Patent: Nov. 17, 2020

(54) APPARATUS AND METHOD FOR CAPABILITY UPDATE IN WIRELESS COMMUNICATION

(71) Applicant: QUALCOMM Incorporated, San Diego, CA (US)

(72) Inventors: John Edward Smee, San Diego, CA (US); Peter Gaal, San Diego, CA (US); Etienne François Chaponniere, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 306 days.

(21) Appl. No.: 14/567,940

(22) Filed: Dec. 11, 2014

(65) Prior Publication Data
US 2015/0372801 A1    Dec. 24, 2015

Related U.S. Application Data

(60) Provisional application No. 62/014,027, filed on Jun. 18, 2014.

(51) Int. Cl.
*H04L 5/16* (2006.01)
*H04W 72/04* (2009.01)
*H04W 88/06* (2009.01)

(52) U.S. Cl.
CPC ............ *H04L 5/16* (2013.01); *H04W 72/048* (2013.01); *H04W 88/06* (2013.01)

(58) Field of Classification Search
None
See application file for complete search history.

(56) References Cited

U.S. PATENT DOCUMENTS

| 4,607,364 | A  | * | 8/1986 | Neumann | ............ | H04M 11/068 |
|---|---|---|---|---|---|---|
|  |  |  |  |  |  | 370/470 |
| 7,068,609 | B2 |  | 6/2006 | Huff |  |  |
| 9,246,662 | B2 |  | 1/2016 | Zhang et al. |  |  |
| 2009/0123131 | A1 | * | 5/2009 | Morioka | ............... | H04L 9/0844 |
|  |  |  |  |  |  | 386/241 |

(Continued)

FOREIGN PATENT DOCUMENTS

| CN | 103765937 A | 4/2014 |
|---|---|---|
| EP | 2784971 A1 | 10/2014 |

(Continued)

OTHER PUBLICATIONS

International Search Report and Written Opinion—PCT/US2015/034913—ISA/EPO—dated Dec. 9, 2015.

*Primary Examiner* — Jeffrey M Rutkowski
*Assistant Examiner* — Ning Li
(74) *Attorney, Agent, or Firm* — Loza & Loza, LLP/Qualcomm

(57) ABSTRACT

Aspects of the present disclosure provide a method of communicating capability information that is operable at an apparatus. The apparatus communicates with another device over a carrier, and transmit a capability indication indicative of the capability of the apparatus to support at least two features based on whether the apparatus is operating in a first duplex mode or a second duplex mode. The capability indication is configured to indicate support of a first feature being dependent upon a second feature, among the at least two features.

20 Claims, 11 Drawing Sheets

(56) References Cited

U.S. PATENT DOCUMENTS

| | | | |
|---|---|---|---|
| 2009/0296609 A1* | 12/2009 | Choi | H04W 72/121 370/281 |
| 2011/0019561 A1 | 1/2011 | Yun et al. | |
| 2011/0038283 A1* | 2/2011 | Yu | H04L 5/143 370/277 |
| 2011/0081934 A1* | 4/2011 | Imamura | H04W 52/146 455/522 |
| 2012/0122515 A1* | 5/2012 | Han | H04W 36/32 455/525 |
| 2012/0127888 A1* | 5/2012 | Fujishima | H04W 72/085 370/252 |
| 2012/0202500 A1 | 8/2012 | Wu et al. | |
| 2012/0214512 A1 | 8/2012 | Siomina et al. | |
| 2012/0230247 A1 | 9/2012 | Kwon et al. | |
| 2012/0315903 A1* | 12/2012 | Yoshimura | H04W 60/04 455/435.1 |
| 2013/0021954 A1* | 1/2013 | Montojo | H04L 5/14 370/295 |
| 2013/0039232 A1 | 2/2013 | Kim et al. | |
| 2013/0051288 A1* | 2/2013 | Yamada | H04W 8/24 370/280 |
| 2013/0215742 A1 | 8/2013 | Sirotkin et al. | |
| 2013/0285574 A1* | 10/2013 | Garcia Morchon | H05B 37/0245 315/297 |
| 2014/0115280 A1* | 4/2014 | Moyer | G06F 9/30043 711/154 |
| 2014/0146697 A1 | 5/2014 | Kim et al. | |
| 2014/0169239 A1* | 6/2014 | Maaref | H04W 72/0446 370/280 |
| 2014/0198773 A1* | 7/2014 | Yin | H04L 5/001 370/336 |
| 2014/0328228 A1* | 11/2014 | Park | H04B 7/2615 370/280 |
| 2015/0333896 A1* | 11/2015 | Damnjanovic | H04W 72/048 370/277 |
| 2016/0174130 A1* | 6/2016 | Ljung | H04W 88/04 370/315 |

FOREIGN PATENT DOCUMENTS

| | | | | |
|---|---|---|---|---|
| GB | 2499259 A | 8/2013 | | |
| WO | WO/2013/077554 | * 10/2012 | | H04L 5/22 |
| WO | WO-2013077554 A1 | 5/2013 | | |
| WO | 2014036025 A1 | 3/2014 | | |

* cited by examiner

*Time Division Duplex*

US 10,841,070 B2

APPARATUS AND METHOD FOR CAPABILITY UPDATE IN WIRELESS COMMUNICATION

PRIORITY CLAIM

This application claims priority to and the benefit of provisional patent application No. 62/014,027 filed in the United States Patent and Trademark Office on 18 Jun. 2014, the entire content of which is incorporated herein by reference.

TECHNICAL FIELD

Aspects of the present disclosure relate generally to communication systems, and more particularly, to communicating capability update(s) of a wireless communication device.

BACKGROUND

Wireless communication networks are widely deployed to provide various communication services such as telephony, video, data, messaging, broadcasts, and so on. Such networks, which are usually multiple access networks, support communications for multiple users by sharing the available network resources. Typically full duplex operation demands extra complexity than that of half duplex operation. However, a full duplex capable device may not always operate in a full duplex mode. Therefore, it is inefficient to size or configure a device's processing capability to operate in full duplex mode together with all other supported features at the same time.

As the demand for mobile broadband access continues to increase, research and development continue to advance wireless communication technologies to meet the growing demand for mobile broadband access, and to advance and enhance the user's experience.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In one aspect, the disclosure provides a method of communicating capability information operable at an apparatus. The apparatus communicates with another device over a carrier, and transmits a capability indication indicative of the capability of the apparatus to support at least two features based on whether the apparatus is operating in a first duplex mode or a second duplex mode. The capability indication is configured to indicate support of a first feature being dependent upon a second feature, among the at least two features.

Another aspect of the disclosure provides a method of communication operable at an apparatus. The apparatus communicates with another device over a carrier, and receives a capability indication from the other device, indicative of the capability of the other device to support at least two features based on whether the other device is operating in a first duplex mode or a second duplex mode. In response to the capability indication, the apparatus configures the apparatus to support the at least two features based on the capability indication, wherein the capability indication is configured to indicate support of a first feature being dependent upon a second feature, among the at least two features.

Another aspect of the disclosure provides an apparatus configured for communication with another device. The apparatus includes means for communicating with the other device over a carrier, and means for transmitting a capability indication indicative of the capability of the apparatus to support at least two features based on whether the apparatus is operating in a first duplex mode or a second duplex mode. The capability indication is configured to indicate support of a first feature being dependent upon a second feature, among the at least two features.

Another aspect of the disclosure provides an apparatus configured for communication with another device. The apparatus includes means for communicating with the other device over a carrier, and means for receiving a capability indication from the other device, indicative of the capability of the other device to support at least two features based on whether the other device is operating in a first duplex mode or a second duplex mode. The apparatus further includes means for, in response to the capability indication, configuring the apparatus to support the at least two features based on the capability indication, wherein the capability indication is configured to indicate support of a first feature being dependent upon a second feature, among the at least two features.

Another aspect of the disclosure provides an apparatus configured for communication with another device. The apparatus includes a communication interface, a memory including code, and at least one processor coupled to the communication interface and the memory. The processor when executing the code includes a communication control block configured to utilize the communication interface to communicate with another device over a carrier; and a capability indication block configured to transmit a capability indication indicative of the capability of the apparatus to support at least two features based on whether the apparatus is operating in a first duplex mode or a second duplex mode. The capability indication is configured to indicate support of a first feature being dependent upon a second feature, among the at least two features.

Another aspect of the disclosure provides an apparatus configured for communication with another device. The apparatus includes a communication interface, a memory including code, and at least one processor coupled to the communication interface and the memory. The processor when executing the code includes a communication control block configured to utilize the communication interface to communicate with another device over a carrier; a capability indication block configured to receive a capability indication from the other device, indicative of the capability of the other device to support at least two features based on whether the other device is operating in a first duplex mode or a second duplex mode; and a configuration control block, in response to the capability indication, configured to configure the apparatus to support the at least two features based on the capability indication. The capability indication is configured to indicate support of a first feature being dependent upon a second feature, among the at least two features.

Another aspect of the disclosure provides a communication system including a plurality of communication devices configured for wireless communication. A first communication device and a second communication device, are configured to communicate with each other utilizing a carrier. The first communication device receives a capability indication from the second communication device, indicative of the capability of the second communication device to support at least two features based on whether the second communication device is operating in a first duplex mode or a second duplex mode. In response to the capability indication, the first communication device is configured to support the at least two features based on the capability indication. The capability indication is configured to indicate support of a first feature being dependent upon a second feature, among the at least two features.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various embodiments. However, it will be apparent to those skilled in the art that these embodiments may be practiced without these specific details. In some instances, well known structures and components are shown in block diagram form in order to avoid obscuring such concepts.

The various concepts presented throughout this disclosure may be implemented across a broad variety of telecommunication systems, network architectures, and communication standards. In accordance with some embodiments of the technology discussed here, wireless communication systems can enable or disable optional features and capabilities in different situations. However, sizing of a communication device's processing power to a worst case scenario could be inefficient if optional features or capabilities are signaled independently. Communications systems according to some embodiments of the disclosure can support full duplex and half duplex operation, which may be applied to end devices, user equipment, relay nodes, device-to-device (D2D) nodes, or any network nodes (e.g., base station, eNB, macrocell, picocell, small/femto cell). In some embodiments, these devices can send a capability indication or update based on whether the devices are operating in full duplex or half duplex communication.

Figure 3:
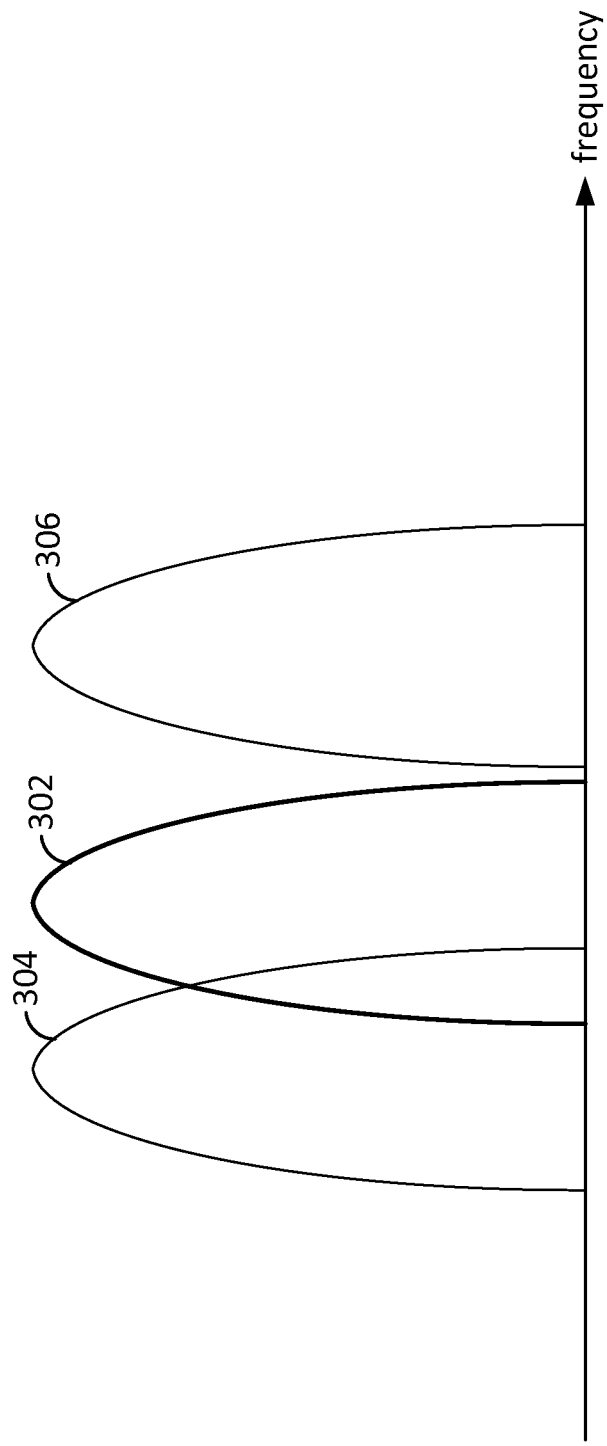
FIG. 3 is a diagram illustrating a number of frequency bands for wireless communication used in accordance with some embodiments.

In wireless communication, full duplex operation has a number of characteristics. For example, wireless communication devices can transmit and receive information (e.g., voice or data traffic) simultaneously in part of the spectrum. In frequency division full duplex, the device may transmit and receive on different frequencies or bands at the same time. In time-division duplex (TDD), the device generally transmits and receives in the same spectrum, frequency, or band at different times. In some embodiments, a full duplex operation may be achieved using the same frequency for both directions (e.g., transmit and receive). For example, a device may utilize transmit and receive frequency bands that are identical or fully overlapping (e.g., frequency 302 of FIG. 3), partially overlapping (e.g., frequency bands 302 and 304 of FIG. 3), or non-overlapping but undesirably close to each other (e.g., frequency bands 302 and 306 of FIG. 3).

In this disclosure, same frequency full duplex (SF-FD) refers to a full duplex operation in which the same frequency band is used for communication in both directions (e.g., uplink and downlink directions). In some embodiments, SF-FD operation also includes bi-directional communication using two frequency bands that are not identical, but are overlapped or substantially close to each other such that it is different from the generally known frequency division full duplex operation that relies on the device's ability to separate the two frequency bands, for example, using filters.

Figure 1:
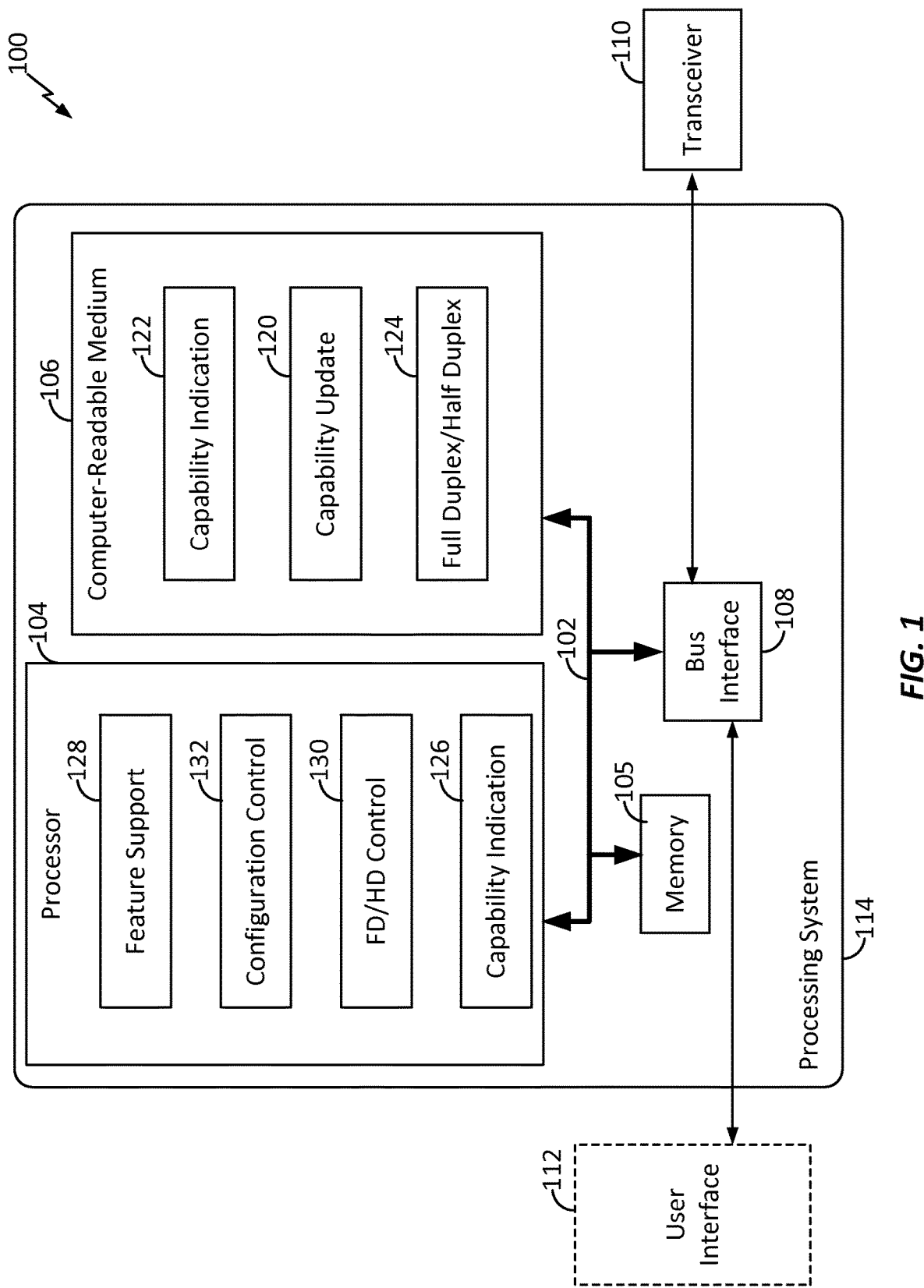
FIG. 1 is a block diagram illustrating an example of a hardware implementation for an apparatus employing a processing system according to some embodiments.
Figure 2:
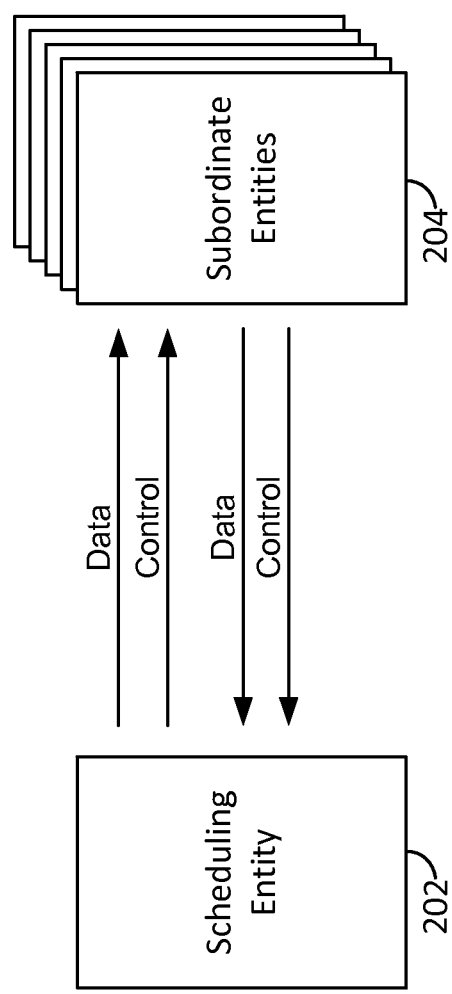
FIG. 2 is a block diagram illustrating an example of a scheduling entity communicating with one or more subordinate entities according to some embodiments.

FIG. 1 is a diagram illustrating an example of a hardware implementation for an apparatus 100 employing a processing system 114 according to some embodiments. In accordance with various aspects of the disclosure, an element, or any portion of an element, or any combination of elements may be implemented with a processing system 114 that includes one or more processors 104. For example, the apparatus 100 may be a user equipment (UE), a base station, a network entity, a relay node, or any device capable of data communications (e.g., wireless communications). In some aspects of the disclosure, the apparatus 100 can be used to implement a scheduling entity 202 or a subordinate entity 204, as illustrated in FIG. 2. In another example, the apparatus 100 may be used to implement a base station, which can be a scheduling entity 202 or a subordinate entity 204. In another example, the apparatus 100 may be used to implement a relay node or a network node, which may be a scheduling entity 202 or a subordinate entity 204. Examples of processors 104 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure, for example, in FIGS. 6-11. That is, the processor 104, as utilized in an apparatus 100, may be used to implement any one or more of the processes described below.

In this example, the processing system 114 may be implemented with a bus architecture, represented generally by the bus 102. The bus 102 may include any number of interconnecting buses and bridges depending on the specific application of the processing system 114 and the overall design constraints. The bus 102 links together various circuits or components including one or more processors (represented generally by the processor 104), a memory 105, and computer-readable media (represented generally by the computer-readable medium 106). The bus 102 may also link various other circuits such as timing sources, peripherals, voltage regulators, and power management circuits, which are well known in the art, and therefore, will not be described any further. A bus interface 108 provides an interface between the bus 102 and a transceiver 110. The transceiver 110 (a communication interface) provides a means for communicating with various other apparatus over a transmission medium. For example, the transceiver 110 may be configured to support full duplex (FD) and/or half duplex (HD) communication. Depending upon the nature of the apparatus, a user interface 112 (e.g., keypad, display, speaker, microphone, joystick, trackpad, touchscreen, camera) may also be provided.

The processor 104 is responsible for managing the bus 102 and general processing, including the execution of software stored on the computer-readable medium 106. The software, when executed by the processor 104, causes the processing system 114 to perform the various functions described below in FIGS. 2-11 for any particular apparatus. The computer-readable medium 106 may also be used for storing data that is manipulated by the processor 104 when executing software. The various blocks and circuitries of the apparatus 100 may be implemented in software, firmware, hardware, or a combination of software, firmware, and hardware.

In some embodiments, the software may include a capability update code 120 that can process and update a capability indication 122. The software may also include a full duplex/half duplex communication code 124. When the capability update code 120 is executed, a capability indication block 126 is configured to perform functions related to updating or maintaining the capability indication 122, and a feature support block 128 is configured to control (e.g., enable or disable) one or more features based on the capability indication 122. The capability indication 122 may be sent to another device to signal the currently supported or configured features of the apparatus 100. Some non-limiting examples of the features may include a maximum number of bits in a data unit processed by the apparatus, a number of carriers aggregated for communication, a communication mode (e.g., full-duplex or half-duplex), a signal modulation scheme, and a category of the apparatus.

The full duplex/half duplex communication code 124 when executed, configures a full duplex (FD)/half duplex (HD) control block 130 (e.g., a communication control block) to perform functions related to full duplex and half duplex communications. The processor 104 also may include a configuration control block 132 that may be configured to coordinate the operations of the feature support blocks 128, FD/HD control block 130, and capability indication block 126. The configuration control block 132 may be utilized to control the various configurations that support different features.

One or more processors 104 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 106. The computer-readable medium 106 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 106 may reside in the processing system 114, external to the processing system 114, or distributed across multiple entities including the processing system 114. The computer-readable medium 106 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

FIG. 2 is a block diagram illustrating a scheduling entity 202 and a number of subordinate entities 204 engaged in wireless communication utilizing one or more data channels and control channels described in further detail below. In one aspect of the disclosure, the scheduling entity 202 and/or the subordinate entities 204 may be implemented using one or more apparatuses 100. The channels illustrated in FIG. 2 are not necessarily all of the channels that may be utilized between a scheduling entity 202 and subordinate entities 204, and those of ordinary skill in the art will recognize that other channels may be utilized in addition to those illustrated, such as other control, signaling, and feedback channels. The scheduling entity 202 may perform various scheduling functions so that the subordinate entities 204 may communicate with the scheduling entity 202 in an orderly manner. Non-limiting examples of the scheduling functions include determining a scheduling scheme, handling communication resource requests from the subordinate entities, determining data rates for the requesting subordinate entities, and transmitting grants to the subordinate entities.

In one example, the scheduling entity 202 may broadcast data (e.g., uplink or downlink data) to one or more subordinate entities 204 (e.g., secondary or other remote entities). Further, the scheduling entity 202 may send different downlink data to different subordinate entities 204, and the one or more subordinate entities 204 may transmit uplink data to the scheduling entity 202. In addition, the scheduling entity 202 may broadcast a control channel to the subordinate entities 204. The scheduling entity 202 may send different control/signaling data to different subordinate entities 204 through the same control channel or different control channels. The control channel(s) may be used for transmitting signaling, overhead messages, paging messages, or control messages including a capability indication (e.g., capability indication 122 of FIG. 1) of the entity. The communication between the scheduling entity 202 and the subordinate entities 204 may be half duplex or full duplex. The scheduling entity 202 may send the capability indication to the subordinate entity 204 or vice versa.

A scheduling entity 202 may be any suitable radio transceiver apparatus. In some examples, it may be referred to by those skilled in the art as a base station (BS), a base transceiver station (BTS), a radio base station, a radio transceiver, a transceiver function, a basic service set (BSS), an extended service set (ESS), an access point (AP), a Node B, an eNode B (eNB), a mesh node, a relay node, or some other suitable terminology. A base station provides wireless access points to a core network for any number of user equipment (UE).

In various aspects of the present disclosure, a wireless communication device may be a scheduling entity 202 and/or a subordinate entity 204. Examples of a wireless communication device includes a UE, a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, entertainment device, wearable communication device, automobile, mesh network, M2M component, a game console, entertainment device, vehicle component, an entity in the Internet of Things, or any other similar functioning device. A wireless communication device may also be referred to by those skilled in the art as a mobile station (MS), a subscriber station, a mobile unit, a subscriber unit, a wireless unit, a remote unit, a mobile device, a wireless device, a remote device, a mobile subscriber station, an access terminal (AT), a mobile terminal, a wireless terminal, a remote terminal, a handset, a terminal, a user agent, a mobile client, a client, or some other suitable terminology.

Wireless communication devices for existing wireless communication networks, such as those defined according to the 3rd Generation Partnership Project (3GPP) standards, may support optional features that are signaled to the network (e.g., a base station) independent of each other. For example, a UE may have capabilities depending on its terminal capability class, category, and/or operational characteristics. For example, in Release 5 of the High Speed Packet Access (HSPA) standard, there are twelve terminal capability categories, which define the capability of a UE in a number of communication parameters. In general, optional features or capabilities of the device are signaled independent of each other. However, independent signaling of capabilities can lead to inefficient design because the likelihood of a device being configured with the worst case (i.e., all features being enabled) may be low. Therefore, a device design that supports a worst case may generally not be cost effective.

Figure 4:
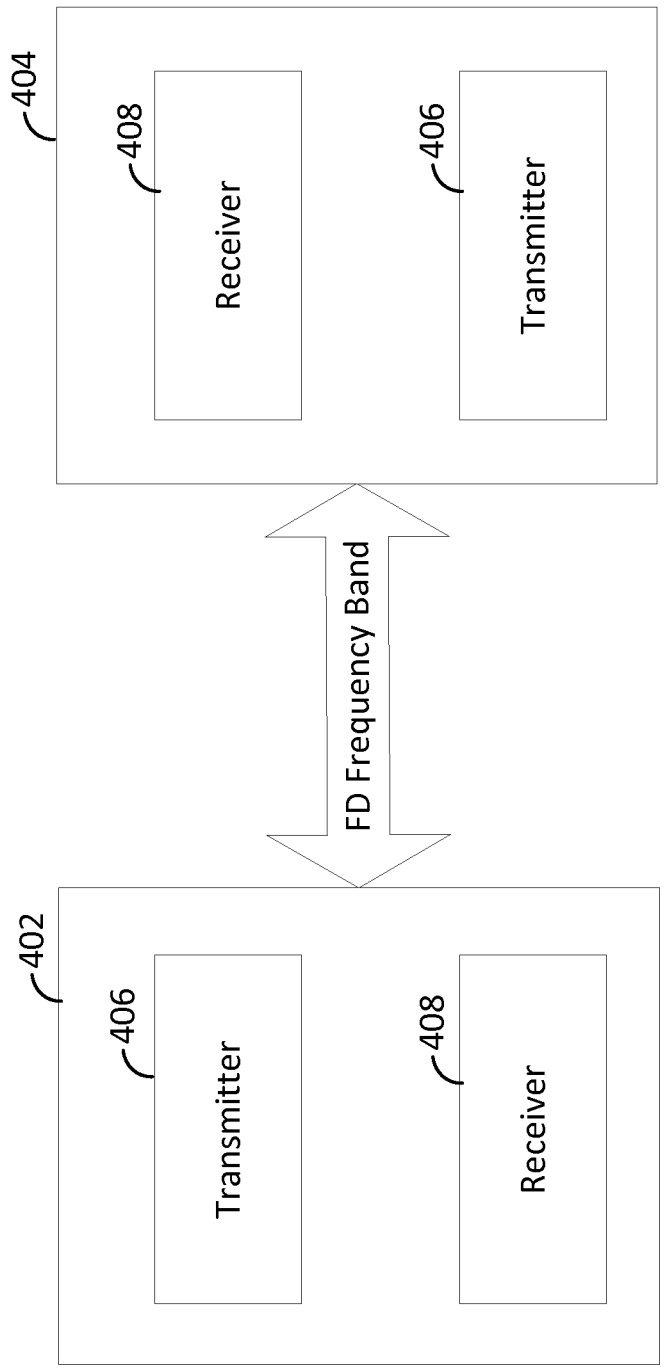
FIG. 4 is a block diagram illustrating two devices communication in same frequency full duplex according to some embodiments.

FIG. 4 is a block diagram illustrating two communication devices 402, 404 communicating to each other using SF-FD in accordance with some embodiments. For example, the two devices 402 and 404 may be a scheduling entity 202 and a subordinate entity 204 of FIG. 2, respectively. In one embodiment, the communication devices 402 and 404 may be implemented using the apparatus 100 of FIG. 1. Each of the devices 402 and 404 may include a transmitter 406 and a receiver 408, which may be an integrated component or separately component. In SF-FD communication, the transmitter 406 of the device 402 may send signals to the receiver of the device 404, while simultaneously the transmitter 406 of the device 404 may send signals to the receiver 408 of the device 402 using the same frequency band or overlapping frequency bands. An SF-FD capable device, however, may not always operate in full duplex mode. In one example, in a point-to-point mode (i.e., device-to-device communication without a base station or a relay node in between), the use of SF-FD operation may depend on the capability of the other end device. In another example, the use of SF-FD communication may depend on the desired trade-off between spectral efficiency and power consumption. In another example, the use of SF-FD communication may depend on any interference conditions influencing the amount of transmit path cancellation that may occur as part of the receiver (i.e., the so-called full duplex cancellation level).

Figure 5:
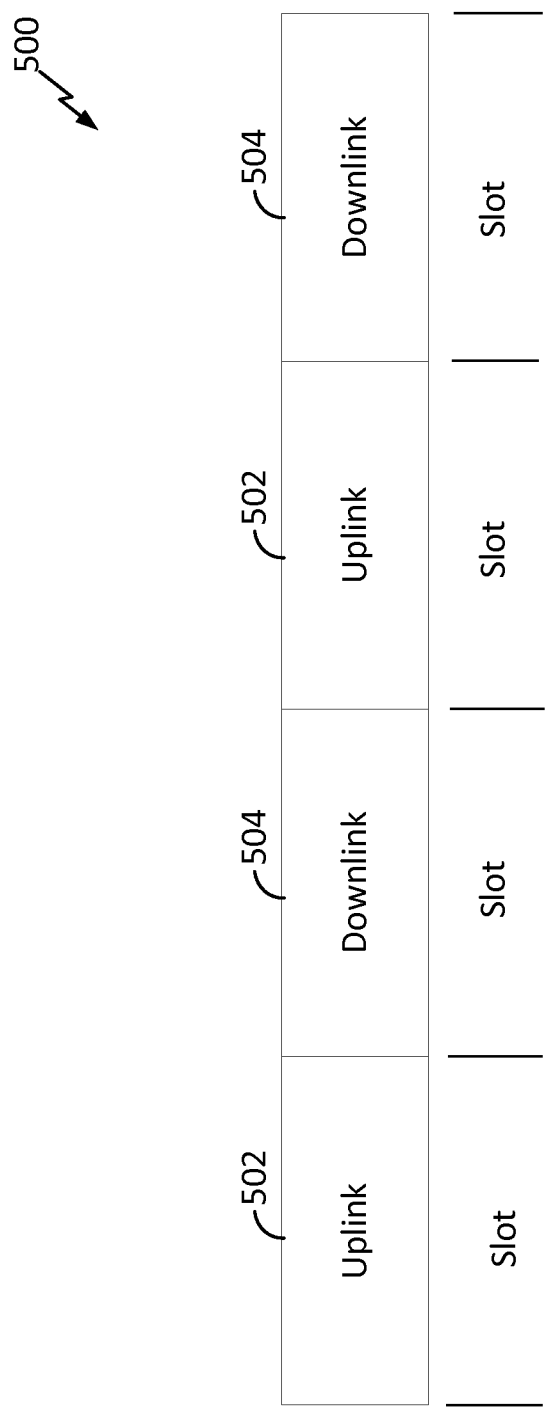
FIG. 5 is a diagram illustrating a time division duplex communication channel according to some embodiments.

The communication device 402 or 404 may also communicate with another device using time division duplex (TDD) communication, which is a half duplex operation. In half duplex mode, the communication devices do not transmit and receive signals simultaneously. That is, the communication device transmits and receives at non-lapping time periods. Different from SF-FD communication, in TDD operations, the device does not transmit and receive at the same time on the same frequency band or different frequency bands. FIG. 5 is a diagram illustrating a TDD communication channel 500 according to some embodiments. For example, a TDD communication device may use an uplink channel 502 that is separated from a downlink channel 504 by the allocation of different time slots in the same frequency band or channel 500. Therefore, TDD communication allows asymmetric flow for uplink and downlink data transmission. A TDD communication device is allocated different time slots for uplink and downlink transmissions. In other words, half duplex transmission (e.g., TDD) allows uplink and downlink transmissions to share the same transmission medium (e.g., same frequency band). Therefore, a TDD communication device may share some communication resources (e.g., receiver (Rx) and transmitter (Tx) hardware resources) during half duplex operation.

In general, when a communication device is switched from the half duplex mode to the SF-FD mode, Tx-Rx resource sharing becomes difficult and sometimes not possible. It can result in reduced Rx and/or Tx capability. For example, the device may perform at a reduced data rate (e.g., half data rate) during full duplex communication compared to that of half duplex. The reduction or degradation in the device's capability in practical cases can be significantly different in different implementations.

Embodiments of the present invention enable and provide for many different types of services or applications, including but not limited to web browsing, video streaming, Voice-Over IP (VoIP), mission critical applications, multi-hop networks, remote operations with real-time feedback (e.g., tele-surgery), etc. These different services and applications may be supported using full duplex (e.g., SF-FD) and/or half duplex communication. Therefore, it is beneficial that a wireless communication device can efficiently update, change, or reconfigure its capability or category based on whether full duplex or half duplex communication is enabled.

In accordance with some embodiments of the present disclosure, a wireless communication device can update or change its capability or category based on a number of operational characteristics. One particular example of such characteristics is whether the device is operating in the full duplex mode (e.g., SF-FD) or half duplex mode. As one example, a communication device can modify one or more of its operations or capabilities based on whether full duplex or half duplex is used. However, the present disclosure is not limited to using only full duplex/half duplex as a condition for updating or changing a device's capability/category. Other suitable operational characteristics may be used to update or change a device's capability/category. In one aspect of the disclosure, the communication device may be configured to size its processing power differently for full duplex and half duplex operations. Once the device updates or changes its capability or category, it may send a capability indication to another device to indicate the currently supported features. In one aspect of the disclosure, the capability indication may be a message having a number of bits less than that of the quantity of the supported features. For example, the capability indication may have 3 bits that are utilized to signal more than 3 features. In addition, the capability indication may indicate the support of a first feature in a way that depends on whether or not a second feature is supported or not. In other words, the capability indication is configured such that the support of one or more features is not independently signaled, reported, or updated.

Some non-limiting examples of the features include a maximum number of bits in a data unit processed by the device, a number of carriers aggregated for communication, a communication mode (e.g., full-duplex or half-duplex), a signal modulation scheme (e.g., quadrature amplitude modulation). As an illustrative example, Table 1 below shows the values of a capability indication and two features (A and B) that may be supported by a communication device, which may be any of the devices or apparatuses shown in FIGS. 1, 2, 4, and 6-8. It should be noted that the feature combinations shown in Table 1 are not exhaustive, and other features combinations may be used.

TABLE 1

| Capability Indication | Features |
|---|---|
| 000 | Feature A: not supported<br>Feature B: not supported |
| 001 | Feature A: not supported<br>Feature B: supported |
| 010 | Feature A: supported<br>Feature B: not supported |
| 011 | Feature A: supported as long as Feature B is not configured<br>Feature B: supported as long as Feature A is not configured |
| 100 | Feature A: supported with or without Feature B<br>Feature B: supported with or without Feature A |

In one example, the communication device sending the capability indication of Table 1 may be a user equipment or subordinate entity, and the receiving device may be a base station or scheduling entity, or vice versa. In response to receiving the capability indication, the receiving device may configure the support of features A and B as illustrated in Tables 2 and 3 as a non-limiting example.

TABLE 2

| Configuration | Features Configuration |
|---|---|
| 00 | Feature A: not configured<br>Feature B: not configured |
| 01 | Feature A: not configured<br>Feature B: configured |
| 10 | Feature A: configured<br>Feature B: not configured |
| 11 | Feature A: configured<br>Feature B: configured |

TABLE 3

Capability Indication Configuration

| | |
|---|---|
| 000 | The configuration must be "00" |
| 001 | the configuration can be "00" or "01" |
| 010 | the configuration can be "00" or "10" |
| 011 | the configuration can be "00" or "01" or "10" |
| 100 | the configuration can be "00" or "01" or "10" or "11" |

The capability indication "000" indicates that both features A and B are not supported; therefore, the receiving device is configured to provide no support for features A and B (i.e., configuration "00"). The capability indication "001" indicates that feature B is supported but not feature A; therefore, the receiving device may be configured to provide no support for both features A and B (i.e., configuration "00") or provide support for feature B but not feature A (i.e., configuration "01"). The capability indication "010" indicates that feature A is supported but not feature B; therefore, the receiving device may be configured to provide no support for both features A and B (i.e., configuration "00") or provide support for feature A but not feature B (i.e., configuration "10"). For the capability indication "011," the receiving device may be configured to provide no support for both features A and B (i.e., configuration "00"), provide support for feature B but not feature A (i.e., configuration "01"), or provide support for feature A but not feature B (i.e., configuration "10"). For the capability indication "100," the receiving device may be configured to provide no support for both features A and B (i.e., configuration "00"), provide support for feature B but not feature A (i.e., configuration "01"), provide support for feature A but not feature B (i.e., configuration "10"), or provide support for both features A and B (i.e., configuration "11").

Figure 6:
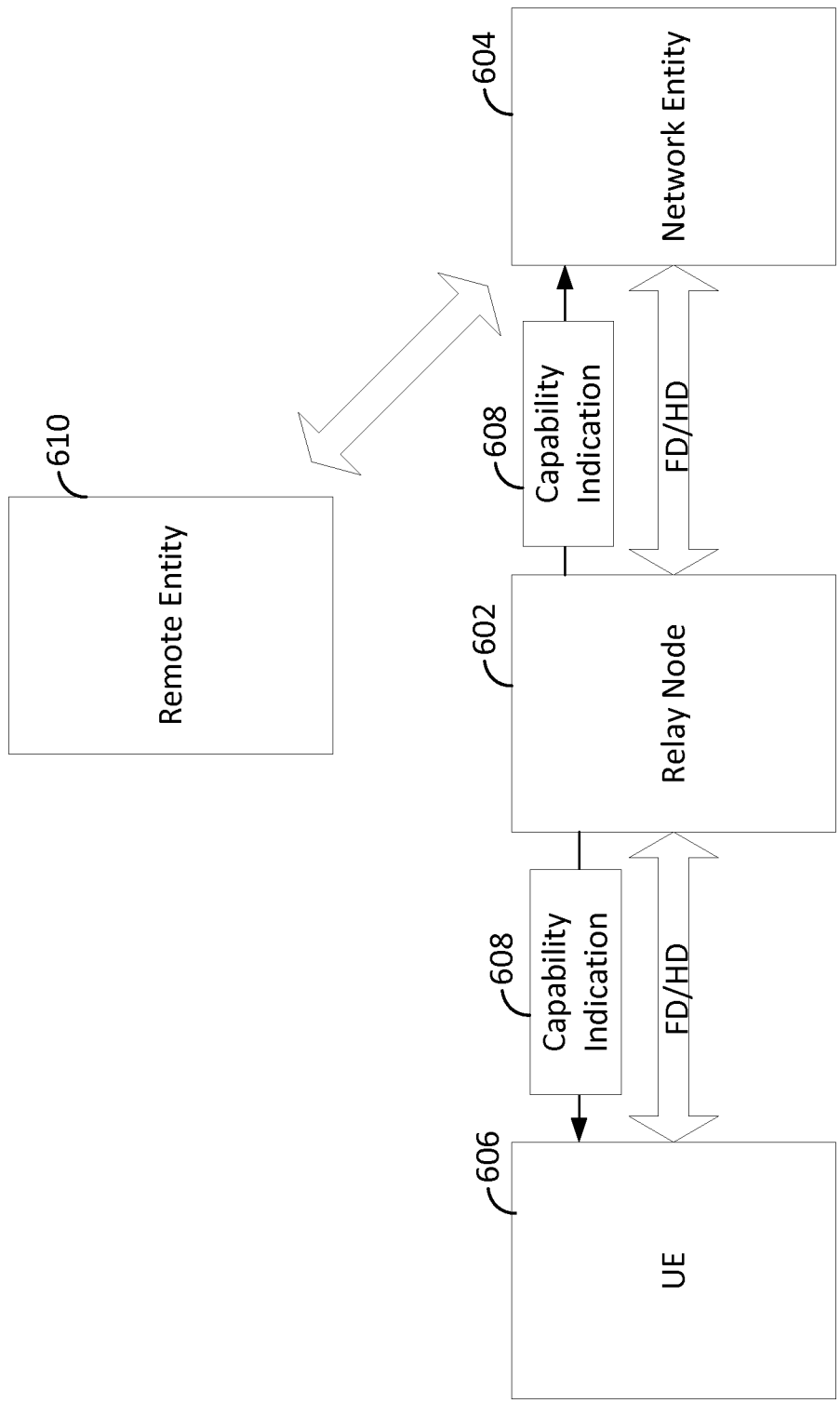
FIG. 6 is a diagram illustrating a device operating as a relay node in accordance with some embodiments.

FIG. 6 is a diagram illustrating a communication device 602 configured as a relay node in accordance with some embodiments. In one example, the relay node 602 may be a scheduling entity 202 or a subordinate entity 204 of FIG. 2. In one aspect of the disclosure, the relay node 602 may be implemented as the apparatus 100. The relay node 602 can relay communication between a UE 606 and a network entity 604 (e.g., a base station, a Node B, etc.). The relay node 602 may communicate with the UE 606 and the network entity 604 in a full duplex or a half duplex mode. In one aspect of the disclosure, the relay node 602 may send a capability indication 608 to its immediately connected nodes (e.g., UE 606 and network entity 604) based on whether the relay node 602 is operating in full duplex or half duplex. The capability indication 608 may indicate the capability of the device to support features based on whether the device is operating in a full duplex mode or a half duplex mode. In one aspect of the disclosure, the full duplex mode of the device 602 is an SF-FD mode. When the relay node 602 is implemented as the apparatus 100, the relay node 602 may execute the full duplex/half duplex code 124 to configure the FD/HD control block 126 and/or the transceiver 110 to communicate in either full duplex or half duplex. In addition, the relay node 602 may execute the capability update code 120 to perform various functions for updating and sending the capability indication to another device.

In various aspects of the disclosure, non-limiting examples of features that can be indicated by utilizing the capability indication 608 may include a maximum number of bits in a data unit processed by the relay node, the number of carriers aggregated, a communication mode (e.g., SF-DF or half duplex), a signal modulation scheme, a device category, etc. For example, the 3GPP Release 8 Standards define a number of user equipment categories with various maximum peak data rates and multiple-input and multiple-output (MIMO) capabilities support.

In one aspect of the disclosure, the capability indication 608 may be the same as the capability indication 122 stored at the computer-readable medium 106 (see FIG. 1). In other aspects of the disclosure, the capability indication 608 may be used to indicate a number of capabilities or features that will be supported by the relay node 602 while operating in a full duplex or a half duplex mode. In some aspects of the disclosure, the relay node 602 may send the capability indication 608 to other network entities (e.g., a remote entity) that are not immediately connected to the relay node 602. Two devices are not immediately connected if there is an intervening device in between. For example, the relay node 602 may send the capability indication 608 to a remote entity 610 (e.g., a UE or a relay node) via the intervening network entity 604. In one aspect of the disclosure, the network entity 604 may utilize the information of the capability indication 608 in its routing decisions.

Figure 7:
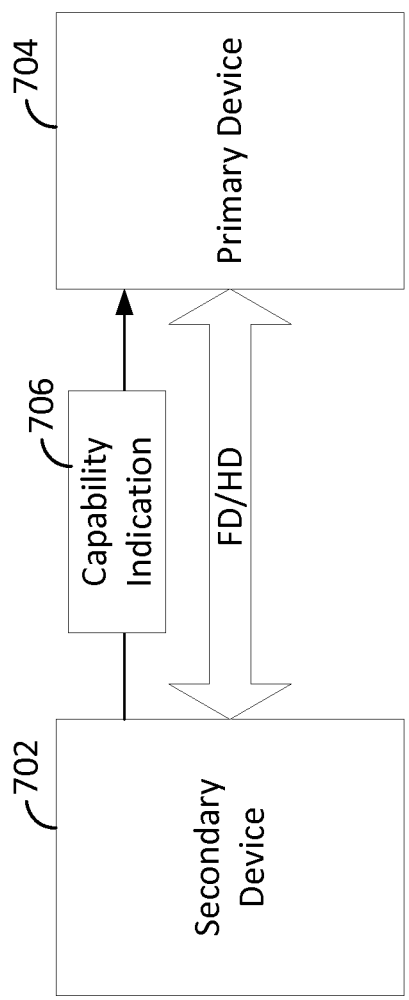
FIG. 7 is a diagram illustrating a device operating as a secondary device in accordance with some embodiments.

FIG. 7 is a diagram illustrating a communication device 702 operating as a secondary device in accordance with some embodiments. In one example, the secondary device 702 may be the scheduling entity 202 or the subordinate entity 204 of FIG. 2. In various aspects of the disclosure, the secondary device 702 may be a UE, a base station, a network entity, a relay node, or a slave device. The secondary device 702 can communicate with a primary device 704 in a full duplex mode or a half duplex mode. In some examples, the primary device 704 may be a UE, a base station, a network entity, a relay node, or a master device. In various aspects of the disclosure, the primary and secondary devices 702 and 704 may be implemented using the apparatus 100. In one aspect of the disclosure, the secondary device 702 may send a capability indication 706 to the primary device 704 based on whether the secondary device 702 is operating in a full duplex mode or a half duplex mode. The capability indication 706 may indicate the capability of the device to support features based on whether the device is operating in a full duplex mode or a half duplex mode. Non-limiting examples of the features that can be indicated by the capability indication 706 may include the maximum number of bits in a data unit processed by the primary device 704 or the secondary device 702, the number of carriers aggregated for communication between the devices, a communication mode (e.g., full duplex or half duplex), a signal modulation scheme, a device category, etc. In some aspects of the disclosure, the capability indication 706 may be utilized to indicate any suitable capabilities or features that are supported by the secondary device 702 in a full duplex mode or a half duplex mode.

Figure 8:
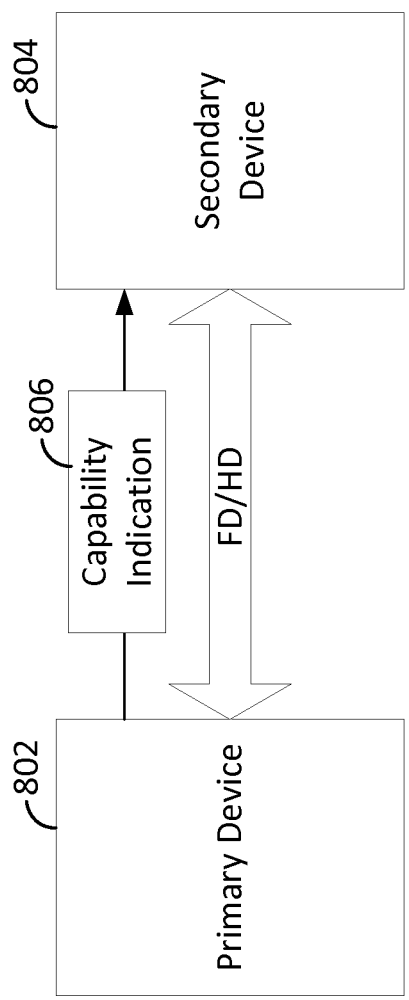
FIG. 8 is a diagram illustrating a device operating as a primary device in accordance with some embodiments.

FIG. 8 is a diagram illustrating a communication device 802 operating as a primary device in accordance with some embodiments. In one example, the primary device 802 may be the scheduling entity 202 or the subordinate entity 204 of FIG. 2. In various aspects of the disclosure, the primary device 802 may be a UE, a base station, a network entity, a relay node, or a master device. The primary device 802 can communicate with a secondary device 804 in a full duplex mode or a half duplex mode. The secondary device 804 may be a UE, a base station, a network entity, a relay node, or a slave device. In various aspects of the disclosure, the primary and secondary devices 802 and 804 may be implemented using the apparatus 100. In one aspect of the disclosure, the primary device 802 may send a capability indication 806 to the secondary device 804 based on whether the primary device 802 is in a full duplex mode or a half duplex mode. Non-limiting examples of features that can be indicated by the capability indication 806 may include the maximum number of bits in a data unit processed by the primary device 802 or the secondary device 804, the number of carriers aggregated for communication between the devices, a communication mode (e.g., full duplex or half duplex), a signal modulation scheme, a device category, etc. In some aspects of the disclosure, the capability indication 806 may be utilized to indicate any suitable capabilities or features that are supported by the primary device 802 depending on whether the primary device 802 is in a full duplex mode or a half duplex mode. In some aspects of the disclosure, the primary device 802 might not send the capability indication 806 to other devices.

In FIGS. 6-8, a communication device capable of sending or utilizing a capability indication may be a scheduling entity (e.g., a scheduling entity 202 of FIG. 2), and a device receiving the capability indication may a subordinate entity (e.g., a subordinate entity 204 of FIG. 2). In some aspects of the disclosure, the capability indication may be a signaling message or a part of a signaling message. An example of a signaling protocol and its signaling messages is defined in the 3GPP Technical Specification (TS) 25.331 Release 12 document, which describes the Radio Resource Control (RRC) signaling protocol of the Universal Mobile Telecommunications System (UMTS). The entire content of this 3GPP TS is incorporated into this disclosure by reference. In some aspects of the disclosure, the capability indication sent to a UE may be the same or different from that sent to a base station. In some aspects of the disclosure, the device's capability, category, or supported features as a function of full duplex operation may be incorporated in the related communication standards (e.g., 3GPP standards) or pre-negotiated between the devices. In this case, the capability indication only needs to indicate full duplex being utilized or not, and the receiving device can assume what capabilities or features the sending device can support.

Figure 9:
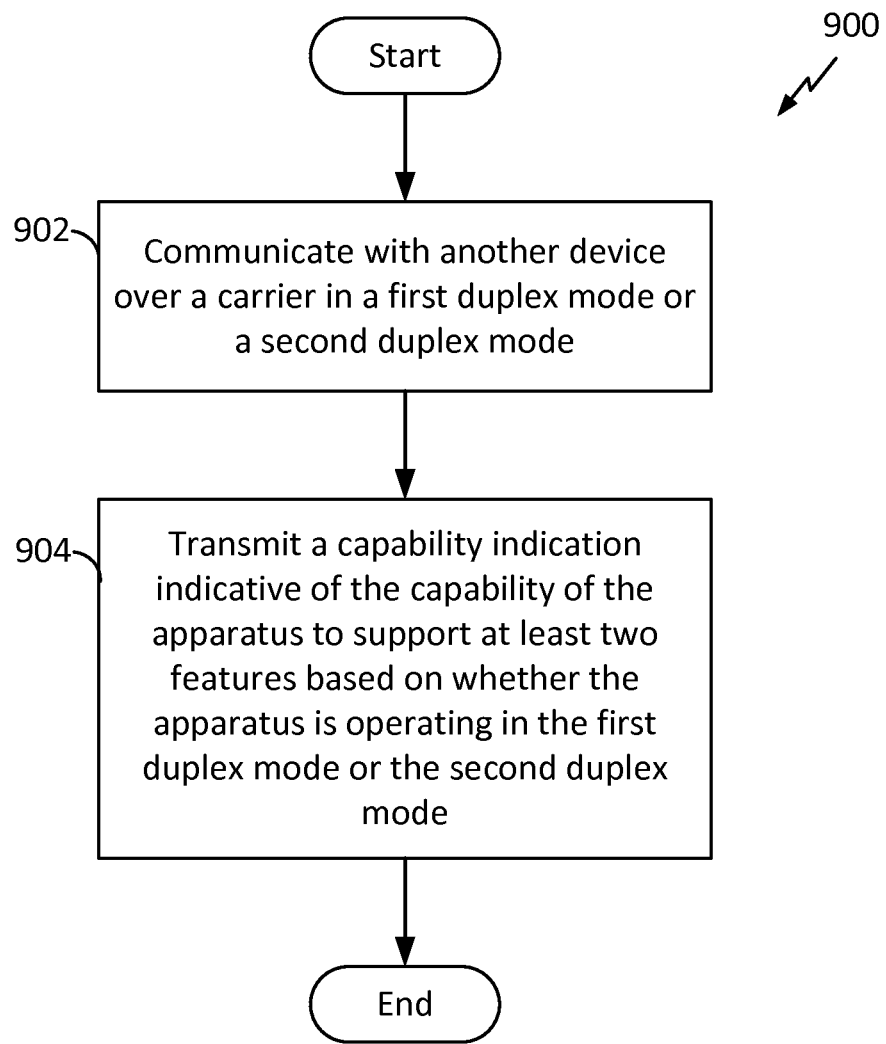
FIG. 9 is a flow chart illustrating a method of communicating capability information of a communication device based on a communication mode in accordance with some embodiments.

FIG. 9 is a flow chart illustrating a method 900 of communicating capability information of an apparatus based on a communication mode in accordance with some embodiments. The capability information may be any of the capability indications illustrated in FIGS. 1 and 6-8. The capability indication can indicate the supported features or category of the device in accordance with a communication mode. For example, the communication mode may be full duplex or half duplex. The method 900 may be performed using any of the devices illustrated in FIGS. 1, 2, 4, and/or 6-8. In various aspects of the disclosure, the apparatus may be a UE, a base station, or a network entity. In one particular example, the method 900 may be performed by an apparatus 100.

At block 902, the apparatus 100 communicates with another device over a carrier in a first duplex mode or a second duplex mode. The carrier may be a communication channel or a frequency band allocated for communication. The communication between the apparatus and the other device may be wireless or wired communication. Some non-limiting examples of wireless communication include cellular, Wi-Fi, Bluetooth, and satellite. The first duplex mode may be a full duplex mode (e.g., SF-FD), and the second duplex mode may be a half duplex mode. In one example, the apparatus 100 may be configured to perform full duplex communication or half duplex communication by executing the full duplex/half duplex code 124. (See FIG. 1). Once configured, the apparatus 100 may utilize the full duplex/half duplex control block 130 (a communication control block) and the transceiver 110 (see FIG. 1) to perform full duplex or half duplex communication with the other device.

At block 904, the apparatus transmits a capability indication indicative of the capability of the apparatus to support at least two features based on whether the apparatus is operating in the first duplex mode or the second duplex mode. The capability indication is configured to indicate support of a first feature being dependent upon a second feature, among the at least two features. In one aspect of the disclosure, the apparatus may configure the feature support block 128 to provide support for the first feature and the second feature. Some non-limiting examples of the features include a maximum number of bits in a data unit, a number of carriers aggregated for communication, a communication mode (e.g., full-duplex or half-duplex), a signal modulation scheme (e.g., quadrature amplitude modulation), a device category, and any features that can be configured/reconfigured (e.g., enabled/disabled) based on whether the apparatus is operating in a full duplex mode or a half duplex mode. In one example, the capability indication may indicate the support of the two features as illustrated in Tables 1-3. In one particular example, one feature may be full duplex, and another feature may be 256-QAM (quadrature amplitude modulation).

Figure 10:
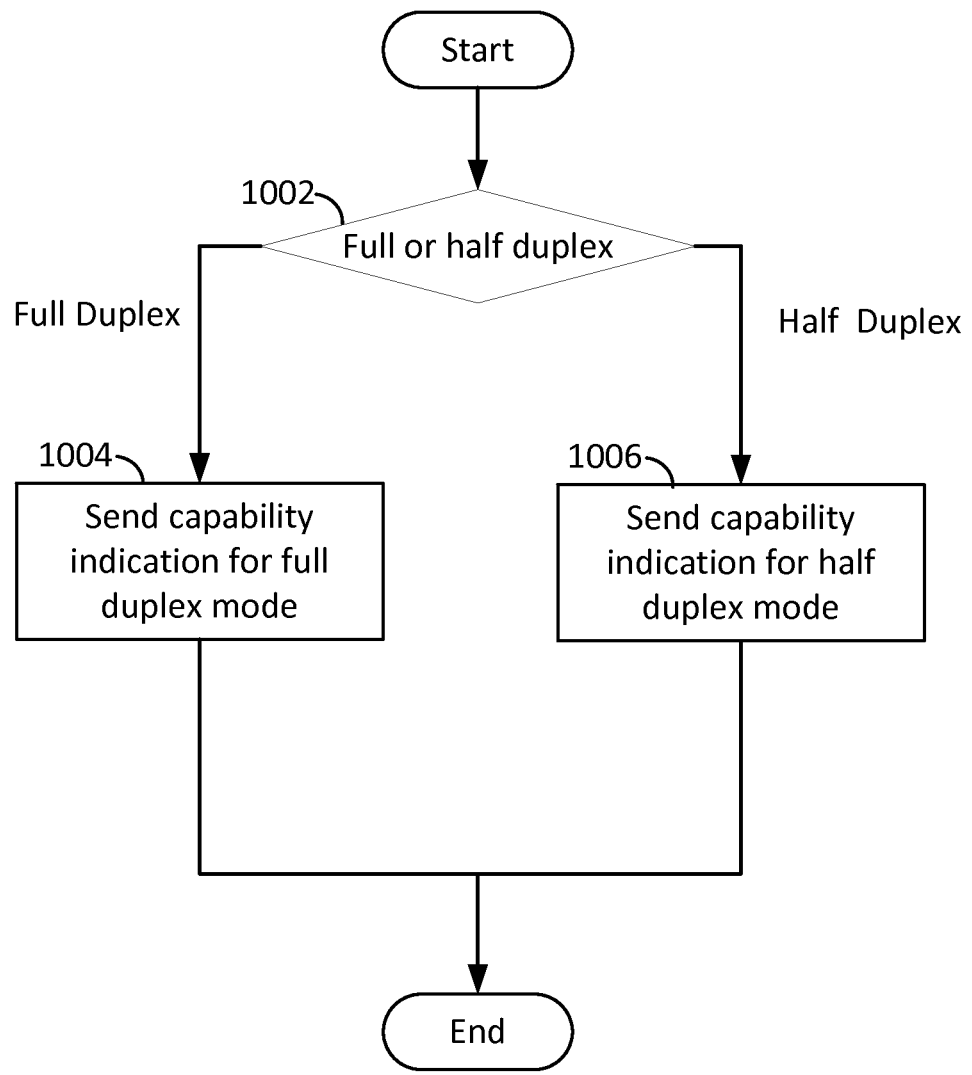
FIG. 10 is a flow chart illustrating more detail on a capability indication utilized in the method illustrated in FIG. 9 in accordance with some embodiments.

FIG. 10 is a flow chart illustrating more detail of the block 904 of FIG. 9 in accordance with some embodiments. At decision block 1002, if the apparatus is operating in a full duplex mode, the method proceeds to block 1004; otherwise the method proceeds to block 1006. For example, the apparatus may utilize a communication control block (e.g., the full duplex/half duplex control block 130) to determine whether the apparatus is in a full duplex mode or a half duplex mode. At block 1004, the apparatus sends a capability indication for full duplex mode. In one aspect of the disclosure, the full duplex mode is an SF-FD mode. At block 1006, the apparatus sends a capability indication for half duplex mode. In some aspects of the disclosure, the apparatus' capability as a function of full duplex/half duplex operation can be standardized or pre-negotiated. Therefore, the capability indication can indicate full duplex or half duplex without including the supported feature information because the receiving device already knows the corresponding features from the standard being used or prior negotiation.

In one example, the capability indication may be configured to indicate that a first feature (e.g., feature A of Tables 1-3) is supported if a second feature (e.g., feature B of Tables 1-3) is not configured. In another example, the capability indication may be configured to indicate that the first feature is supported if the second feature is configured. In another example, the capability indication may be configured not to indicate support of the features individually.

Figure 11:
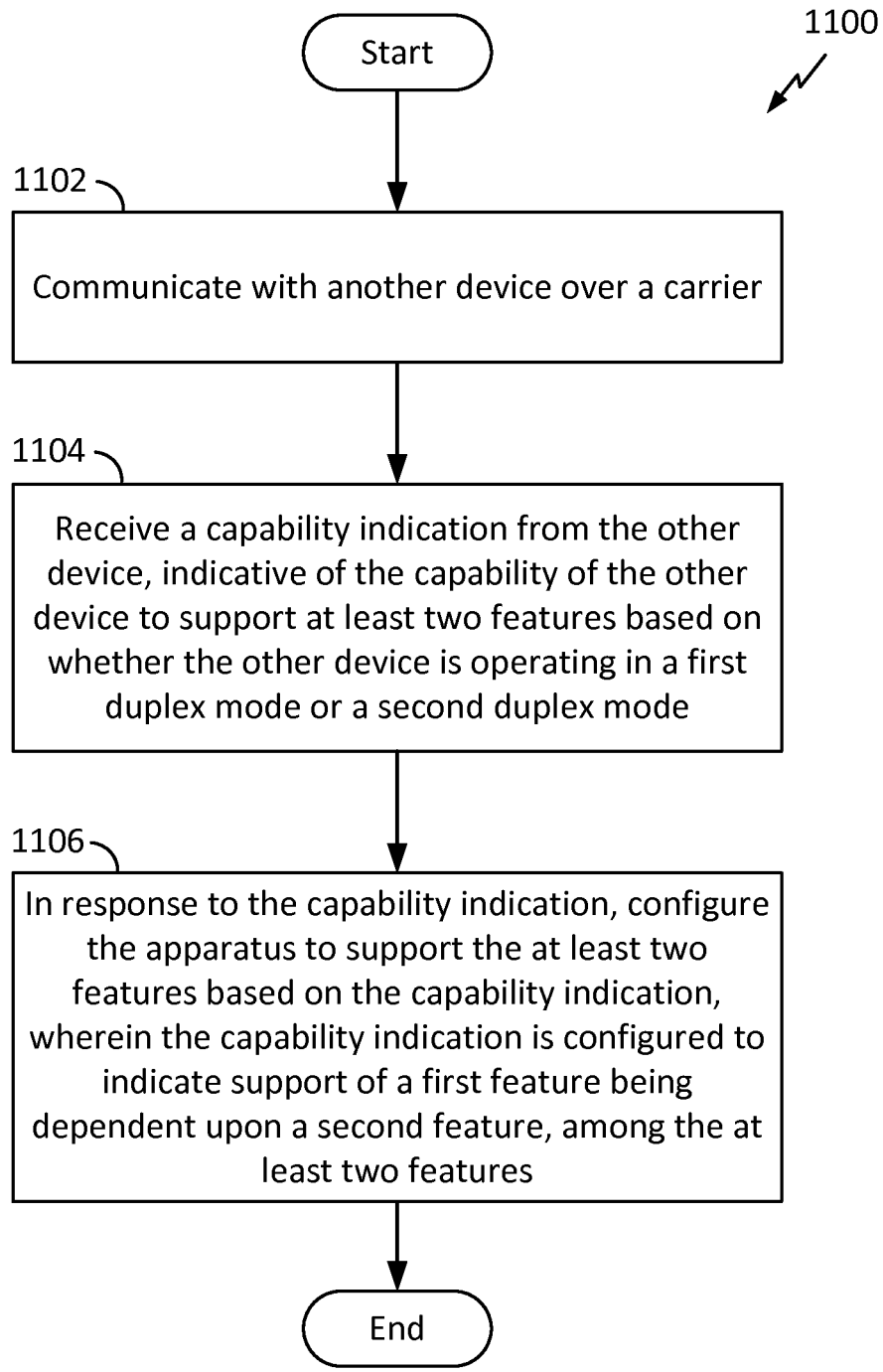
FIG. 11 is a flow chart illustrating a method of configuring an apparatus based on a capability indication received from another device in accordance with some embodiments.

FIG. 11 is a flow chart illustrating a method 1100 of configuring an apparatus based on a capability indication received from another device in accordance with some embodiments. In various aspects of the disclosure, the apparatus and the other device may be a UE, a base station, or a network entity. For example, the method 1100 may be performed by any of the apparatuses or devices illustrated in FIGS. 1, 2, 4, and/or 6-8. In one particular example, the method 1100 may be performed by an apparatus 100 of FIG. 1.

At block 1102, an apparatus 100 communicates with another device over a carrier. The carrier may be a communication channel or a frequency band allocated for communication. The communication between the apparatus and the other device may be wireless or wired communication. Some examples of wireless communication include cellular, Wi-Fi, Bluetooth, and satellite. The first duplex mode may be a full duplex mode (e.g., SF-FD), and the second duplex mode may be a half duplex mode. In one example, the apparatus 100 may be configured to perform full duplex communication or half duplex communication by executing the full duplex/half duplex code 124. (See FIG. 1). Once configured, the apparatus 100 may utilize the full duplex/half duplex control block 130 and the transceiver 110 (see FIG. 1) to perform full duplex or half duplex communication with other devices.

At block 1104, the apparatus receives a capability indication from the other device, indicative of the capability of the other device to support at least two features based on whether the other device is operating in the first duplex mode or the second duplex mode. For example, the capability indication may be the same as any of the capability indications illustrated in FIGS. 1 and 6-8.

At block 1106, in response to the capability indication, the apparatus is configured to support the at least two features based on the capability indication. For example, the capability indication may indicate support of a first feature being dependent upon a second feature, among the at least two features. In one aspect of the disclosure, the apparatus may change its operation, enable/disable various features, or adjust or size available processing power based on the capability indication. In one example, the apparatus may enable full duplex mode and allocate more processing power if the capability indication indicates that the other device supports full duplex operation. In another example, the apparatus may enable half duplex mode and allocate less processing power if the capability indication indicates that the other device does not support full duplex operation.

In one aspect of the disclosure, the apparatus may utilize the feature support block 128 to provide support for the first feature and the second feature. Some non-limiting examples of the features include a maximum number of bits in a data unit, a number of carriers aggregated for communication, a communication mode (e.g., full-duplex or half-duplex), a signal modulation scheme (e.g., quadrature amplitude modulation), a device category, and any features that can be configured/reconfigured (e.g., enabled/disabled) based on whether the apparatus is operating in a full duplex mode or a half duplex mode. In one example, the two features may be the features A and B of Tables 1-3. In one particular example, feature A may be full duplex, and feature B may be 256-QAM.

As those skilled in the art will readily appreciate, various aspects described throughout this disclosure may be extended to any suitable telecommunication systems, network architectures and communication standards. By way of example, various aspects may be applied to UMTS systems such as W-CDMA, TD-SCDMA, and TD-CDMA. Various aspects may also be applied to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems, including those described by yet-to-be defined wide area network standards. The actual telecommunication standard, network architecture, and/or communication standard employed may depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first die may be coupled to a second die in a package even though the first die is never directly physically in contact with the second die. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-11 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-11 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

What is claimed is:

1. A method of communicating capability information operable at an apparatus, comprising:
    communicating with another device over a carrier utilizing a half duplex mode or a same frequency full duplex (SF-FD) mode;
    transmitting a first capability indication configured to control a plurality of features in a first configuration by the apparatus in the half duplex mode, wherein the plurality of features comprise at least two of a maximum number of bits in a data unit, a number of carriers aggregated for communication, a signal modulation scheme, or a device category;
    transmitting a second capability indication configured to control the plurality of features in a second configuration by the apparatus in the SF-FD mode, wherein the second capability indication indicates that a capability of the apparatus to support a first feature of the plurality of features depends on whether a second feature of the plurality of features is enabled,
    wherein each of the first capability indication and the second capability indication comprises a message comprising a number of bits corresponding to the plurality of features, the number of bits fewer than available configurations of the plurality of features, to indicate that the plurality of features are respectively disabled or enabled at the apparatus based on whether the apparatus is communicating in the half duplex mode or the SF-FD mode; and
    controlling an operation of the plurality of features based on the first capability indication and second capability indication.

2. The method of claim 1,
    wherein the second capability indication indicates that the first feature is enabled when the second feature is disabled.

3. The method of claim 1,
    wherein the second capability indication indicates that the first feature is enabled when the second feature is enabled.

4. The method of claim 1, wherein the second capability indication does not individually control at least two of the plurality of features.

5. The method of claim 1, wherein the apparatus comprises at least one of a relay node, a user equipment, a base station, or a network entity.

6. The method of claim 1, wherein the transmitting the second capability indication comprises transmitting the second capability indication to the other device that is not immediately connected to the apparatus.

7. The method of claim 1, wherein the apparatus comprises a primary device or a secondary device.

8. The method of claim 1, wherein the second capability indication comprises a signaling message.

9. A method of communication operable at an apparatus, comprising:
communicating with another device over a carrier utilizing a half duplex mode or a same frequency full duplex (SF-FD) mode;
receiving a first capability indication from the other device, configured to control a plurality of features in a first configuration by the other device in a half duplex mode, wherein the plurality of features comprise at least two of a maximum number of bits in a data unit, a number of carriers aggregated for communication, a signal modulation scheme, or a device category;
receiving a second capability indication from the other device, configured to control the plurality of features in a second configuration by the other device in the SF-FD mode, wherein the second capability indication indicates that a capability of the other device to support a first feature of the plurality of features depends on whether a second feature of the plurality of features is enabled,
wherein each of the first capability indication and the second capability indication comprises a message comprising a number of bits corresponding to the plurality of features, the number of bits fewer than available configurations of the plurality of features, to indicate that the plurality of features are respectively disabled or enabled at the other device based on whether the other device is communicating in the half duplex mode or the SF-FD mode; and
in response to the second capability indication, configuring the apparatus to control the plurality of features based on the second capability indication.

10. The method of claim 9,
wherein the second capability indication indicates that the first feature is enabled when the second feature is disabled.

11. The method of claim 9,
wherein the second capability indication indicates that the first feature is enabled when the second feature is enabled.

12. The method of claim 9, wherein the second capability indication does not individually control at least two of the plurality of features.

13. The method of claim 9, wherein the apparatus comprises at least one of a relay node, a user equipment, a base station, or a network entity.

14. The method of claim 9, wherein the apparatus comprises a primary device or a secondary device.

15. The method of claim 9, wherein the second capability indication comprises a signaling message.

16. An apparatus configured for communication with another device, comprising:
means for communicating with the other device over a carrier utilizing a half duplex mode or a same frequency full duplex (SF-FD) mode;
means for transmitting a first capability indication configured to control a plurality of features in a first configuration by the apparatus in the half duplex mode, wherein the plurality of features comprise at least two of a maximum number of bits in a data unit, a number of carriers aggregated for communication, a signal modulation scheme, or a device category;
means for transmitting a second capability indication configured to control the plurality of features in a second configuration by the apparatus in the SF-FD mode, wherein the second capability indication indicates that a capability of the apparatus to support a first feature of the plurality of features depends on whether a second feature of the plurality of features is enabled,
wherein each of the first capability indication and the second capability indication comprises a message comprising a number of bits corresponding to the plurality of features, the number of bits fewer than available configurations of the plurality of features, to indicate that the plurality of features are respectively disabled or enabled at the apparatus based on whether the apparatus is communicating in the half duplex mode or the SF-FD mode; and
means for controlling an operation of the plurality of features based on the first capability indication and second capability indication.

17. An apparatus configured for communication with another device, comprising:
means for communicating with the other device over a carrier utilizing a half duplex mode or a same frequency full duplex (SF-FD) mode;
means for receiving a first capability indication from the other device, configured to control a plurality of features in a first configuration by the other device in a half duplex mode, wherein the plurality of features comprise at least two of a maximum number of bits in a data unit, a number of carriers aggregated for communication, a signal modulation scheme, or a device category;
means for receiving a second capability indication from the other device, configured to control the plurality of features in a second configuration by the other device in the SF-FD mode, wherein the second capability indication indicates that a capability of the other device to support a first feature of the plurality of features depends on whether a second feature of the plurality of features is enabled,
wherein each of the first capability indication and the second capability indication comprises a message comprising a number of bits corresponding to the plurality of features, the number of bits fewer than available configurations of the plurality of features, to indicate that the plurality of features are respectively disabled or enabled at the other device based on whether the other device is communicating in the half duplex mode or the SF-FD mode; and
means for, in response to the second capability indication, configuring the apparatus to support the plurality of features based on the second capability indication.

18. An apparatus comprising:
a communication interface;
a memory comprising code; and
at least one processor coupled to the communication interface and the memory;
wherein the processor when executing the code is configured to:
utilize the communication interface to communicate with another device over a carrier utilizing a half duplex mode or a same frequency full duplex (SF-FD) mode;
transmit a first capability indication configured to control a plurality of features in a first configuration by the apparatus in the half duplex mode, wherein the plurality of features comprise at least two of a maximum number of bits in a data unit, a number of carriers aggregated for communication, a signal modulation scheme, or a device category;

transmit a second capability indication configured to control the plurality of features in a second configuration by the apparatus in the SF-FD mode, wherein the second capability indication indicates that a capability of the apparatus to support a first feature of the plurality of features depends on whether a second feature of the plurality of features is enabled, wherein each of the first capability indication and the second capability indication comprises a message comprising a number of bits corresponding to the plurality of features, the number of bits fewer than available configurations of the plurality of features, to indicate that the plurality of features are respectively disabled or enabled at the apparatus based on whether the apparatus is communicating in the half duplex mode or the SF-FD mode; and control an operation of the plurality of features based on the first capability indication and second capability indication.

19. An apparatus comprising:
a communication interface;
a memory comprising code; and
at least one processor coupled to the communication interface and the memory;
wherein the processor when executing the code is configured to:
  utilize the communication interface to communicate with another device over a carrier utilizing a half duplex mode or a same frequency full duplex (SF-FD) mode;
  receive a first capability indication from the other device, configured to control a plurality of features in a first configuration by the other device in the half duplex mode, wherein the plurality of features comprise at least two of a maximum number of bits in a data unit, a number of carriers aggregated for communication, a signal modulation scheme, or a device category;
  receive a second capability indication from the other device, configured to control the plurality of features in a second configuration by the other device in the SF-FD mode, wherein the second capability indication indicates that a capability of the other device to support a first feature of the plurality of features depends on whether a second feature of the plurality of features is enabled,
  wherein each of the first capability indication and the second capability indication comprises a message comprising a number of bits corresponding to the plurality of features, the number of bits fewer than available configurations of the plurality of features, to indicate that the plurality of features are respectively disabled or enabled at the other device based on whether the other device is communicating in the half duplex mode or the SF-FD mode; and
  in response to the second capability indication, configure the apparatus to support the plurality of features based on the second capability indication.

20. A communication system comprising a plurality of communication devices configured for wireless communication, comprising:
a first communication device and a second communication device, configured to communicate with each other over a carrier utilizing a half duplex mode or a same frequency full duplex (SF-FD) mode,
wherein the first communication device receives a first capability indication from the second communication device, configured to control a plurality of features in a first configuration by the second communication device in the half duplex mode, the plurality of features comprising at least two of a maximum number of bits in a data unit, a number of carriers aggregated for communication, a signal modulation scheme, or a device category,
wherein the first communication device receives a second capability indication from the second communication device, configured to control the plurality of features in a second configuration by the second communication device in the SF-FD mode, wherein the second capability indication indicates that a capability of the second communication device to support a first feature of the plurality of features depends on whether a second feature of the plurality of features is enabled,
wherein each of the first capability indication and the second capability indication comprises a message comprising a number of bits corresponding to the plurality of features, the number of bits fewer than available configurations of the plurality of features, to indicate that the plurality of features are respectively disabled or enabled at the second communication device based on whether the second communication device is communicating in the half duplex mode or the SF-FD mode, and
wherein in response to the second capability indication, the first communication device is configured to control the plurality of features based on the second capability indication.

* * * * *